(12) United States Patent
Batot et al.

(10) Patent No.: US 9,706,001 B2
(45) Date of Patent: Jul. 11, 2017

(54) REMOTE ACTIVE WINDOW SENSING AND REPORTING FEATURE

(71) Applicant: INTERNATIONAL BUSINESS MACHINES CORPORATION, Armonk, NY (US)

(72) Inventors: Fronz F. Batot, Austin, TX (US); Adam R. Holley, Austin, TX (US); Randy S. Johnson, O'Fallon, MO (US); Tedrick N. Northway, Wood River, IL (US); Howard N. Smallowitz, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 14/548,809

(22) Filed: Nov. 20, 2014

(65) Prior Publication Data
US 2015/0081895 A1 Mar. 19, 2015

Related U.S. Application Data

(63) Continuation of application No. 13/550,909, filed on Jul. 17, 2012, now Pat. No. 8,918,527, which is a
(Continued)

(51) Int. Cl.
*H04L 29/08* (2006.01)
*H04L 12/58* (2006.01)
(Continued)

(52) U.S. Cl.
CPC ............ *H04L 67/24* (2013.01); *G06Q 10/10* (2013.01); *H04L 12/1831* (2013.01);
(Continued)

(58) Field of Classification Search
CPC ......... H04L 43/08; H04L 51/04; H04L 67/22; H04L 67/24; H04L 51/043;
(Continued)

(56) References Cited

U.S. PATENT DOCUMENTS 3,744,712 A 7/1973 Papadopoulos et al.
5,303,042 A 4/1994 Lewis et al.
(Continued)

OTHER PUBLICATIONS

Cooperstock, Jeremy R. et al., "Reactive Environments, Throwing Away Your Keyboard and Mouse", Communications of the AMC, Sep. 1997, vol. 40, No. 9, p. 65-73.
(Continued)

*Primary Examiner* — Ramy M Osman
(74) *Attorney, Agent, or Firm* — Christopher McLane; Andrew M. Calderon; Roberts Mlotkowski Safran Cole & Calderon P.C.

(57) ABSTRACT

A system and method is provided for remote active window sensing of a display in a computing device and reporting of the same. The system includes a tool including a remote monitoring and reporting component configured to monitor active windows of one or more remote devices and provide a report to a presenter as to whether the active windows of the one or more remote devices are for a presentation of the presenter.

17 Claims, 6 Drawing Sheets

Related U.S. Application Data continuation of application No. 11/968,835, filed on Jan. 3, 2008, now Pat. No. 8,281,003.

(51) Int. Cl.
  *H04L 12/18* (2006.01)
  *G06Q 10/10* (2012.01)
  *H04L 12/26* (2006.01)

(52) U.S. Cl.
  CPC ............ *H04L 43/08* (2013.01); *H04L 51/043* (2013.01); *H04L 51/12* (2013.01); *H04L 67/22* (2013.01)

(58) Field of Classification Search
  CPC ............. H04L 12/1822; H04L 12/1827; H04L 12/1831; G06Q 10/10; G06F 17/21; G06F 17/24
  See application file for complete search history.

(56) References Cited

U.S. PATENT DOCUMENTS

| | | | |
|---|---|---|---|
| 5,619,555 A | | 4/1997 | Fenton et al. |
| 6,141,528 A * | | 10/2000 | Remschel ................ G09B 7/02 434/156 |
| 6,353,929 B1 | | 3/2002 | Houston |
| 6,496,201 B1 | | 12/2002 | Baldwin et al. |
| 6,628,767 B1 | | 9/2003 | Wellner et al. |
| 6,707,489 B1 | | 3/2004 | Maeng et al. |
| 7,030,835 B2 | | 4/2006 | Krempl |
| 7,058,682 B2 * | | 6/2006 | McGee ................ H04L 51/04 370/260 |
| 7,117,529 B1 | | 10/2006 | O'Donnell et al. |
| 7,234,943 B1 | | 6/2007 | Aleali |
| 7,299,257 B2 | | 11/2007 | Boyer et al. |
| 7,363,330 B1 * | | 4/2008 | Ellman ............. G06F 17/30194 707/620 |
| 7,376,129 B2 | | 5/2008 | Acharya et al. |
| 7,392,290 B1 * | | 6/2008 | Duffield ................ H04L 51/04 709/206 |
| 7,507,091 B1 * | | 3/2009 | Aleali ....................... G09B 7/00 434/236 |
| 7,515,900 B2 | | 4/2009 | Van Camp |
| 7,945,619 B1 * | | 5/2011 | Chawla ................... H04L 67/22 348/14.08 |
| 8,281,003 B2 * | | 10/2012 | Batot ..................... H04L 43/08 709/224 |
| 8,392,503 B2 * | | 3/2013 | Kuhlke ............... H04L 12/1822 348/14.01 |
| 8,763,020 B2 * | | 6/2014 | Toebes ................ H04N 21/466 725/13 |
| 8,918,527 B2 * | | 12/2014 | Batot ..................... H04L 43/08 709/229 |
| 9,240,127 B2 * | | 1/2016 | Wong ................ H04N 21/4182 |
| 2002/0078441 A1 | | 6/2002 | Drake et al. |
| 2002/0104015 A1 | | 8/2002 | Barzilai et al. |
| 2002/0143876 A1 | | 10/2002 | Boyer et al. |
| 2003/0030668 A1 | | 2/2003 | Morrison |
| 2003/0182375 A1 | | 9/2003 | Zhu et al. |
| 2004/0019701 A1 * | | 1/2004 | McGee ................ H04L 51/04 709/250 |
| 2004/0103426 A1 | | 5/2004 | Ludvig et al. |
| 2005/0099492 A1 | | 5/2005 | Orr |
| 2005/0198589 A1 * | | 9/2005 | Heikes ................ H04L 51/04 715/805 |
| 2005/0257250 A1 | | 11/2005 | Mitchell et al. |
| 2006/0007151 A1 | | 1/2006 | Ram |
| 2006/0031083 A1 * | | 2/2006 | Dalal ..................... G06Q 10/10 709/204 |
| 2006/0047748 A1 * | | 3/2006 | Kelso ................ H04L 12/1813 709/204 |
| 2006/0080614 A1 * | | 4/2006 | Lentz ..................... H04N 7/15 715/753 |
| 2006/0206560 A1 | | 9/2006 | Kanada et al. |
| 2006/0230058 A1 * | | 10/2006 | Morris ................ G06F 17/3089 |
| 2006/0256390 A1 * | | 11/2006 | Racovolis ............... G06F 17/24 358/305 |
| 2007/0005752 A1 * | | 1/2007 | Chawla ............... H04L 12/1831 709/224 |
| 2007/0150916 A1 | | 6/2007 | Begole et al. |
| 2007/0255818 A1 | | 11/2007 | Tanzer et al. |
| 2008/0034085 A1 * | | 2/2008 | Chawla ............... H04L 12/1831 709/224 |
| 2008/0046884 A1 | | 2/2008 | Shin et al. |
| 2008/0051081 A1 * | | 2/2008 | Nelson ..................... H04L 67/22 455/432.3 |
| 2008/0320082 A1 * | | 12/2008 | Kuhlke ............... H04L 12/1822 709/205 |
| 2009/0006568 A1 | | 1/2009 | Messenger et al. |
| 2009/0063639 A1 | | 3/2009 | Lingafelt et al. |
| 2009/0070859 A1 | | 3/2009 | Mathur et al. |
| 2009/0177766 A1 * | | 7/2009 | Batot ..................... G06Q 10/10 709/224 |
| 2009/0282476 A1 | | 11/2009 | Nachenberg et al. |
| 2010/0013918 A1 | | 1/2010 | Ta'Eed |
| 2010/0112540 A1 * | | 5/2010 | Gross ....................... G09B 5/10 434/351 |
| 2010/0259611 A1 * | | 10/2010 | Keshavarzian .... G08B 21/0476 348/143 |
| 2012/0284665 A1 * | | 11/2012 | Batot ..................... H04L 43/08 715/802 |
| 2013/0124623 A1 * | | 5/2013 | Munter ............... H04L 12/1822 709/204 |
| 2015/0081895 A1 * | | 3/2015 | Batot ..................... G06Q 10/10 709/224 |

OTHER PUBLICATIONS

Nelson, Les et al., "Palette: A Paper Interface for Giving Presentations", Papers, CHI 99 15-20, May 1999, p. 354-361.

"Script-based System for Monitoring Client-side Activity", A. Kulpa, J. Swacha, R. Budzowski, Technologies for Business Information Systems, pp. 393-402, 2007.

"Knowing the User's Every Move—User Activity Tracking for Website Usability Evaluation and Implicit Interaction", R. Atterer, M. Wnuk, A. Schmidt, International World Wife Web Conference Committee (IW3C2), pp. 203-212, May 23-26, 2006.

\* cited by examiner

REMOTE ACTIVE WINDOW SENSING AND REPORTING FEATURE

FIELD OF THE INVENTION

The invention generally relates to a system and method for computer systems and, more particularly, the invention relates to a system and method for remote active window sensing of a display in one or more computing devices and providing a reporting of the same.

BACKGROUND OF THE INVENTION

More and more teams work in remote corners of the globe. As a result, it is not uncommon for the members of a single project team to gather and present to each other using telephones and various remote conferencing technologies. Numerous technologies exist to facilitate such exchanges including International Business Machine Corp.'s Collaboration Tools (e.g., e-meetings). (International Business Machine Corp. and e-meetings are trademarks of International Business Machine Corp. in the United States, other countries or both).

This trend has allowed businesses to distribute work to teams composed of the most cost-effective, talented people, regardless of their locations. However call-in meetings and presentations also have a number of distinct disadvantages. One of the most notable of these disadvantages is that participants who are not speaking are often distracted, and may multi-task by using other computer applications while a speaker is presenting their materials. While few of us would be rude enough to pick up a newspaper and read it during a speaker's presentation in a face-to-face meeting, most people think nothing of checking their e-mail, exchanging instant messages, or working on another assignment in the middle of a presentation that is being done by a remote speaker. This leads to inefficient meetings and, in some cases, such distractions actually detract from the presentation, itself.

Accordingly, there exists a need in the art to overcome the deficiencies and limitations described hereinabove.

SUMMARY OF THE INVENTION

In a first aspect of the invention, a tool comprises a remote monitoring and reporting component configured to monitor active windows of one or more remote devices. The remote monitoring and reporting component is also configured to provide a report to a presenter as to whether the active windows of the one or more remote devices are associated with a presentation of the presenter.

In another aspect of the invention, a method is provided for deploying a monitoring and reporting feature. The method comprises providing a computer infrastructure operable to: request and monitor active window status on one or more remote devices; receive the active window status; generate a report of the active window status; and provide the report to a presenter of material on a computing device.

In another aspect of the invention, a computer program product is provided for monitoring active window status on a remote device and generating a report of the active window status. The computer program product comprises a computer readable media which includes: first program instructions to request active window status of one or more remote devices which have enabled a monitoring and reporting function requested by a presenter of material; second program instructions to generate a report to the presenter as to whether active windows of the one or more remote devices are associated with a presentation of the presenter; and third program instructions to provide the report to the presenter in a reporting screen. The first, second and third program instructions are stored in a computer system for execution by a central processing unit.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for monitoring active windows displayed on one or more computing devices. More specifically, the invention is configured to sense or monitor active windows on a remote computing device and provide a report of the displayed active windows to a requestor, e.g., a presenter of material. In operation, the invention would limit multi-tasking of remote users during a presentation, by monitoring and reporting which active windows are being displayed on the remote user's device. Thus, in implementation, the application on the remote user's device (e.g., attendee) would not only display the presentation material, but would report back to the presenter which active windows are being displayed on the attendees' devices. The method could enforce a degree of participation that does not exist in current remote presentation technology.

In embodiments, the present invention is configured to be used with Intranet, Extranet or Internet applications which offer a user the capabilities of providing presentational materials to remote users. More particularly, the present invention is configured to monitor and/or sense (hereinafter generally referred to as "monitor") which active windows are being displayed on a remote computing device during a presentation over, for example, the World Wide Web. A report can be sent back to the presenter, providing relevant information such as, for example, which remote devices are currently displaying the presentation materials, etc.

The present invention can be provided by a service provider (third party) or be built directly into a presentation application such as, for example, International Business Machine Corp.'s Collaboration tools (e.g., e-Meeting). The present invention can also be built directly into other applications such as Microsoft's Netmeeting and WebX. (Microsoft and Netmeeting are trademarks of Microsoft Corporation in the United States, other countries, or both.) Alternatively, the system and method of the invention can be resident on the user's computing device, independent of the collaboration tool or service provider.

System Environment

Figure 1:
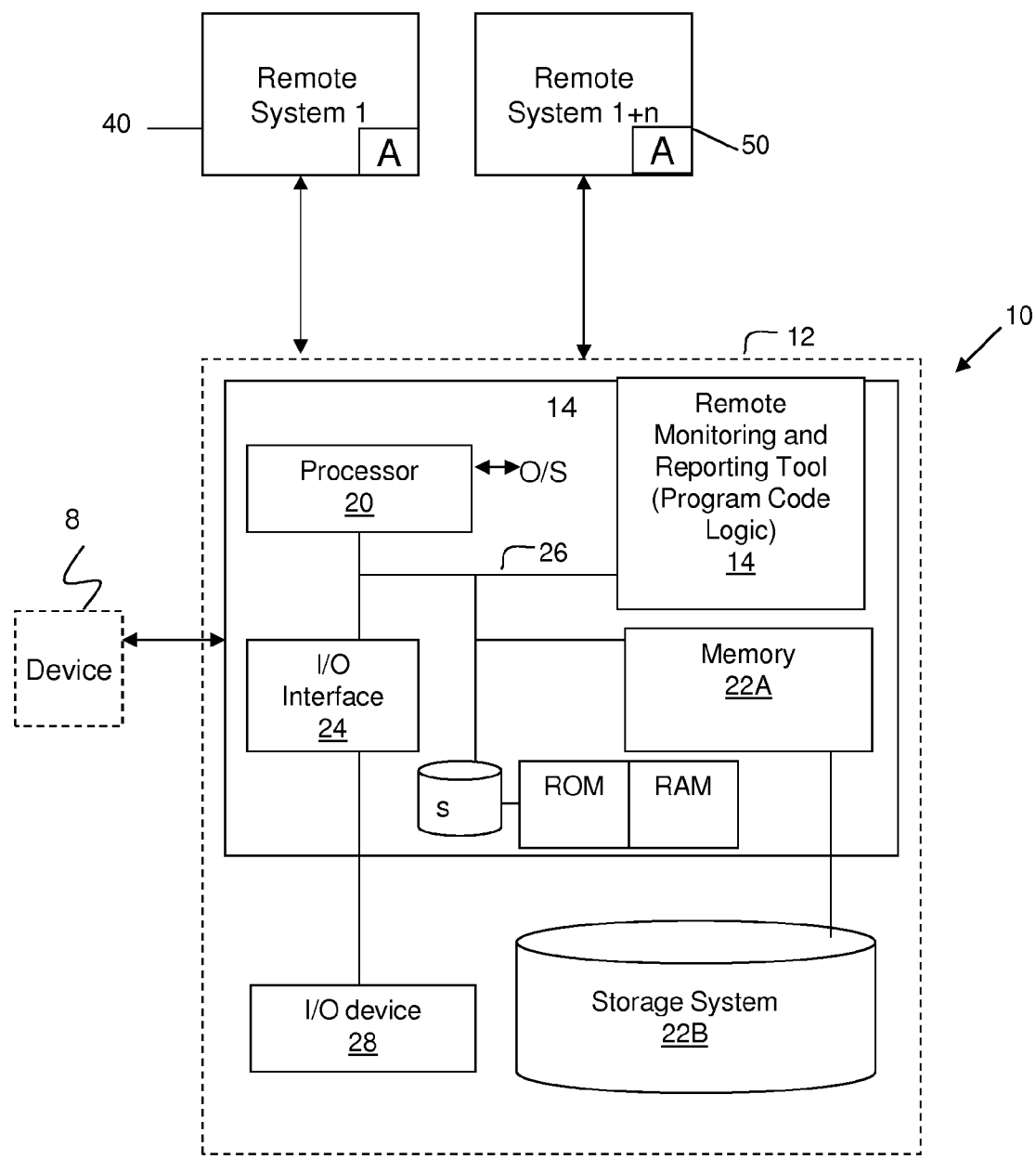
FIG. 1 shows an illustrative environment for implementing the invention.

FIG. 1 shows an illustrative environment 10 for managing the processes in accordance with the invention. To this extent, the environment 10 can be representative of a service provider, providing the services of the system and method of the invention. In this implementation, a computing device 8 of the user (e.g., presenter) would be remote from the environment 10, and would be configured to request the monitoring and reporting services from the service provider prior to or at some time during a presentation. The collaboration tool could be resident on the device 8, to be activated by the user independently of the system and method of the invention.

Alternatively, the environment 10 may be a computing device of the presenter using the collaboration tool such as, for example, e-Meeting. In this implementation, the device 8 would be integrated into the illustrative environment 10 and, more particularly, would be part of the computing device represented by reference numeral 14. Also, in this implementation, unlike when using a service provider, the system and method of the invention (hereinafter referring to as a "remote monitoring and/or reporting tool") would preferably be built directly into the collaboration tool; although, it should be understood that the remote monitoring and/or reporting tool may simply reside on the computing device to be activated by the user, independently of the collaboration tool.

In any situation, the illustrative environment 10 includes a computer infrastructure 12 that can perform the processes described herein. In particular, the computer infrastructure 12 includes the computing device 14 that comprises the remote monitoring and/or reporting tool 16. The remote monitoring and/or reporting tool 16 includes Program Code Logic implementing the features of the remote monitoring and/or reporting tool. In embodiments, prior to or during a presentation, the Program Code Logic sends a request (in embodiments, through the service provider) to each agent "A" on each remote device 40, 50, requesting participation with the remote monitoring and/or reporting tool. Upon enablement, the remote monitoring and/or reporting tool will request which active windows are being displayed on the remote devices 40, 50. The request can be provided over any type of communications link such as, for example, any combination of wired and/or wireless links; any combination of one or more types of networks (e.g., the Internet, a wide area network, a local area network, a virtual private network, etc.); and/or utilize any combination of transmission techniques and protocols.

In turn, the agent "A" determines which window is active on the remote devices by invoking the Application Programming Interface (API) on the remote devices 40, 50. In addition, the agent "A" can determine the status of additionally specified windows by invoking the API on the remote devices 40,50, regardless of whether they are active or not. These processes can be performed periodically at predetermined intervals, e.g., every one minute or, alternatively, the request can be sent periodically at predetermined intervals, e.g., every one minute. As should be understood, the API is a source code interface that an operating system or library provides to support requests for services to be made of it by computer programs. In embodiments, the user's of the remote devices may have the ability to disable the monitoring function (and reporting function) of the remote monitoring and/or reporting tool.

Once a determination is made as to which active window is displayed on the remote device 40, 50, the agent "A" sends the active window information to the computing device 14 (which, depending on the application can be the service provider or the presenter). The computing device 14, in turn, can use this information to generate a report and display such report on an external I/O device 28 of the presenter. In the embodiment of a service provider, it would be the service provider that generates the report and sends such report to the presenter. The I/O device 28 can comprise any device that enables an individual to interact with the computing device 14 or any device that enables the computing device 14 to communicate with one or more other computing devices using any type of communications link. In this implementation, the I/O external device 28 is representative of a display; although, the external I/O device/resource 28 may be keyboards, pointing devices, etc.

Still referring to FIG. 1, the computing device 14 includes a processor 20, a memory 22A, an input/output (I/O) interface 24, and a bus 26. The memory 22A can include local memory employed during actual execution of program code (including the Program Logic Code), bulk storage, and cache memories which provide temporary storage of at least some program code in order to reduce the number of times code must be retrieved from bulk storage during execution. Further, the computing device 14 is in communication with the external I/O device/resource 28 and a storage system 22B.

In general, the processor 20 executes computer program code (including the Program Logic Code), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the computing environment 10 represents a service provider, such as a Solution Integrator. The service provider could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement.

Exemplary Implementation of the System of the Invention

Figure 2:
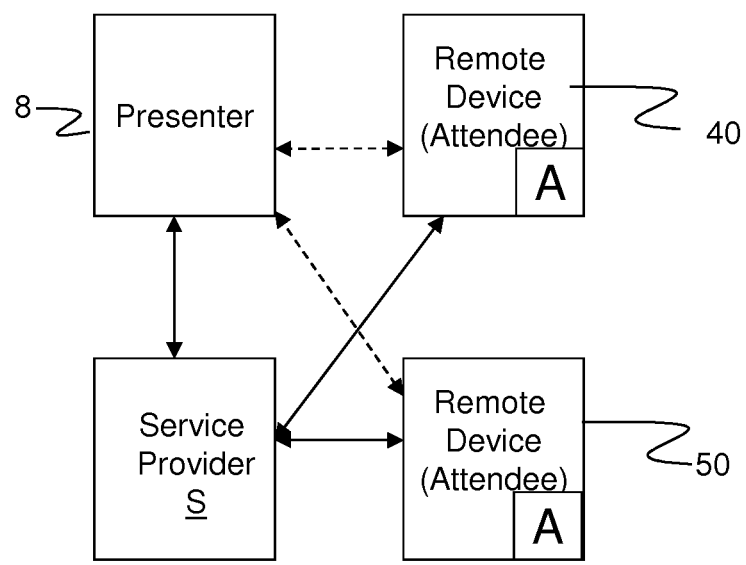
FIG. 2 shows a first implementation of the present invention using a service provider.

FIG. 2 shows a general overview of one implementation of the invention. In particular, FIG. 2 shows the different participants during a presentation, for example, the presenter 8, the attendees 40, 50 and the service provider (S). The participants are connected via the Internet, in this implementation; although, it should be understood that the participants may communicate over an intranet, extranet, etc. In this implementation, discussed in more detail below, the presenter is communicating through the service provider (S).

Prior to the initiation of a presentation, the presenter will request the enablement of the service from the service provider (S). At the request of the presenter, the service provider (S) will initiate the service allowing, in some embodiments, for each of the attendees 40, 50 to enable or disable the service. In this case, the service provider (S) will report back to the presenter 8 with such information as:
  which of the remote devices opted for disablement of the monitoring and reporting; or
  which of the remote devices opted for enablement of the monitoring and reporting.

The presenter 8 can begin the presentation of materials using the collaboration tools, resident on its computing device. In embodiments, the presentation is provided through the service provider (S), with the implementation of the services provided herein.

In the case of opting for enablement of monitoring and reporting, during the presentation the active windows of the attendees 40, 50 (remote devices) will be monitored by the API (via the agent). The status of the active windows will be transmitted back to the presenter, via the service provider (S). In embodiments, though, agents of the attendees 40, 50 (remote devices) can report directly to the presenter 8, bypassing the service provider (S). In this implementation, though, it is preferable that all communications be directed through the service provider (S), thereby allowing the service provider (S) to generate the reports and freeing resources on the device of the presenter 8. The attendees, if given the option, may select to disable the reporting during the presentation.

The reports can include, for example, which windows are active on which attendee device and/or whether the presentation window is active. In other contemplated reports, the report will inform the presenter 8 whether a system failure or a maintenance issue has or is occurring on any attendee device 40, 50, or whether attendee devices are receiving a common message (which would be the active window). In embodiments, depending on the participation of the attendees, the presenter 8 can continue with the presentation, postpone the presentation, request the attendees to display the presentation window as the active window, or take some other action.

Figure 3:
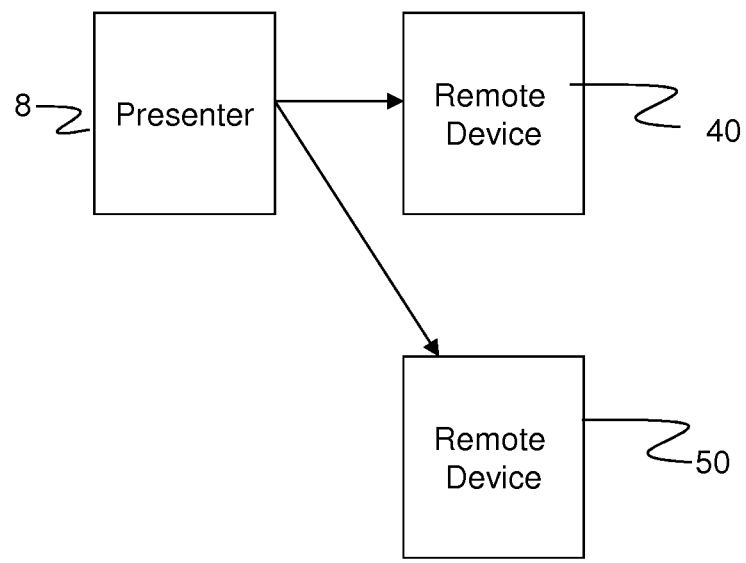
FIG. 3 shows a second implementation of the present invention, bypassing a service provider.

FIG. 3 shows a general overview of another implementation of the invention. In particular, FIG. 3 shows the different participants during a presentation, for example, the presenter 8 and the attendees 40, 50. In this implementation, the service provider (S) is no longer required since the remote monitoring and/or reporting tool is directly built into the collaboration tool (or is resident on the presenter's device, in some other manner). The participants are connected via the Internet, in this implementation; although, it should be understood that the participants may communicate over an intranet, extranet, etc. In this implementation, the presenter is communicating directly with the attendees.

Prior to the initiation of a presentation, the presenter will activate the remote monitoring and reporting tool directly from his/her device and preferably via the collaboration tool. In this case, the presenter and more specifically the remote monitoring and/or reporting tool will send a request to the attendees 40, 50. In embodiments, the attendee may opt out of the monitoring and reporting by a user selectable interface. In such a case, the attendees 40, 50 will provide the selected option to the presenter 8. The presenter will present the materials using the collaboration tool, resident on its computing device, regardless of whether the attendee(s) have opted out of the monitoring and reporting.

In the case of opting for enablement of monitoring and reporting, during the presentation, the active windows, or windows specified to be monitored, of the attendees 40, 50 (remote devices) will be monitored by the API (via the agent). The status of the monitored windows will then be transmitted back to the presenter 8. The remote monitoring and/or reporting tool can then generate reports. The attendees, if given the option, may select to disable the reporting during the presentation.

As discussed with reference to FIG. 2, the reports can include, for example, which windows are active on which attendee device and/or whether the presentation window is active. In other contemplated reports, the presenter 8 can determine whether a system failure or a maintenance issue has or is occurring on any attendee device 40, 50, or whether attendee devices are receiving a common message (which would be the active window). In embodiments, depending on the participation of the attendees, the presenter 8 can continue with the presentation, postpone the presentation, request the attendees to reactive the presentation window, or take some other action.

Exemplary Processes in Accordance with the Invention

Figure 4:
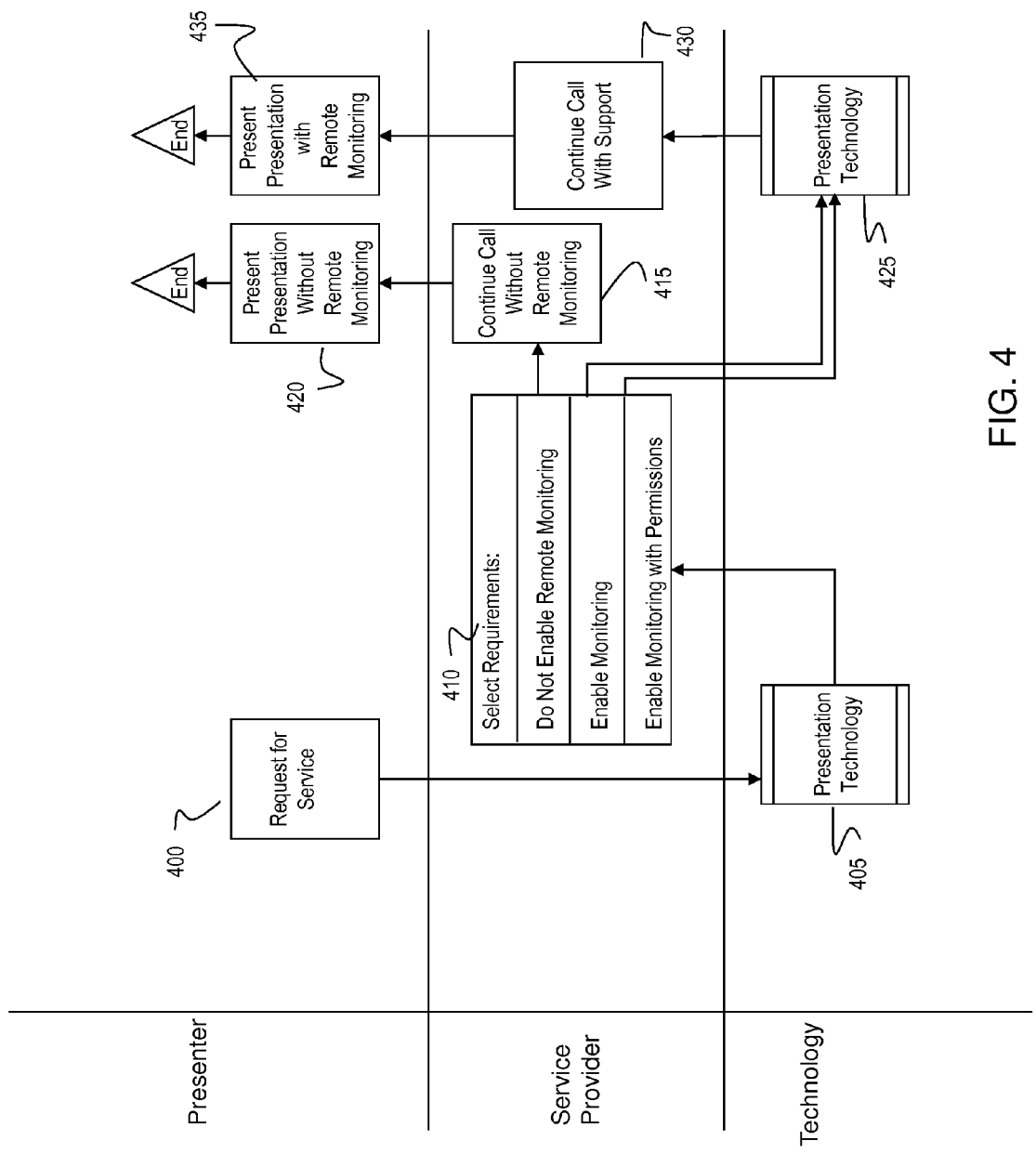
FIG. 4 illustrates a swim lane diagram showing n active window reporting enablement feature in accordance with the invention.
Figure 5:
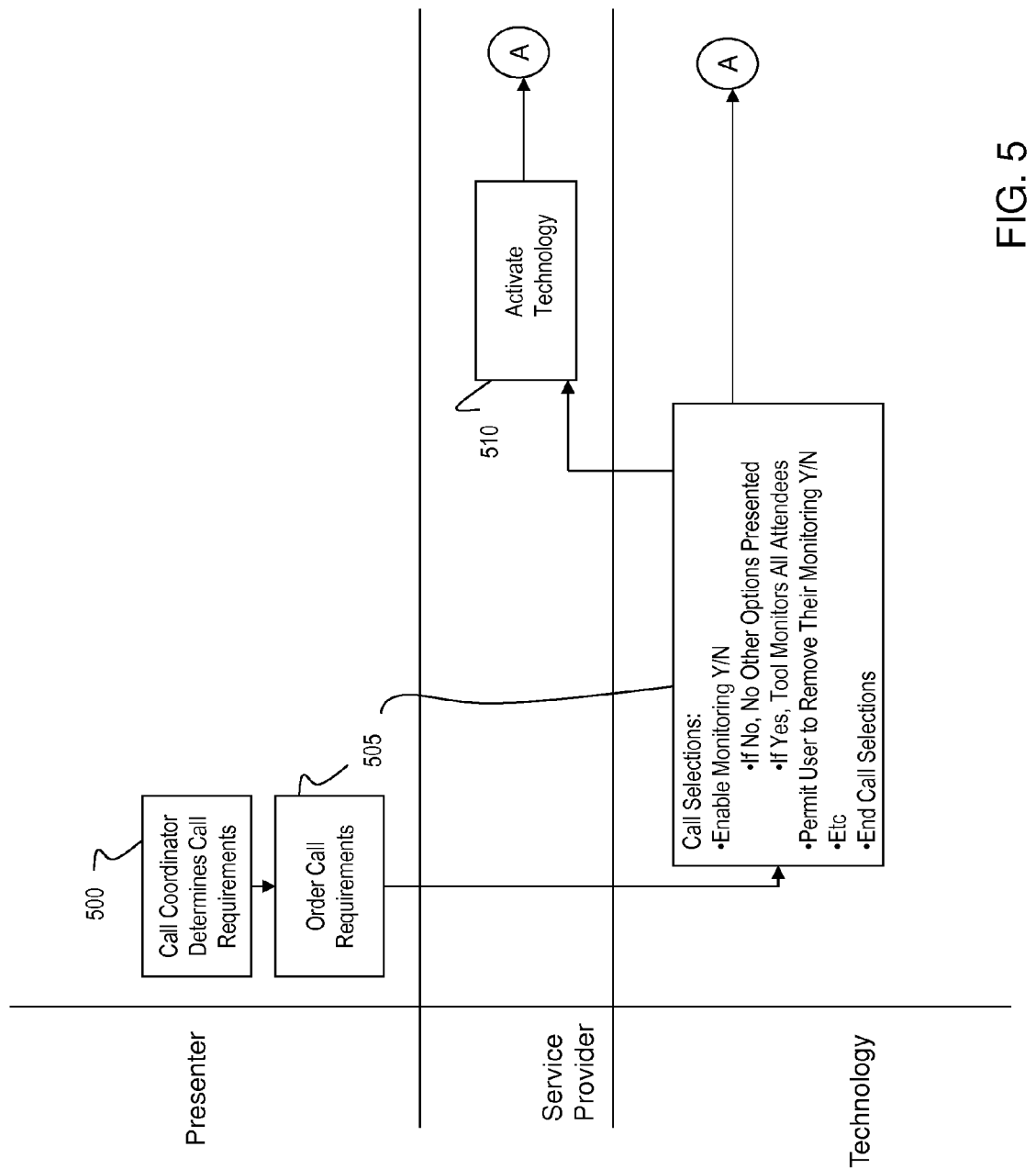
FIGS. 5 and 6 illustrate swim lane diagrams showing an active window monitoring and reporting enablement implementation in accordance with the invention.
Figure 6:
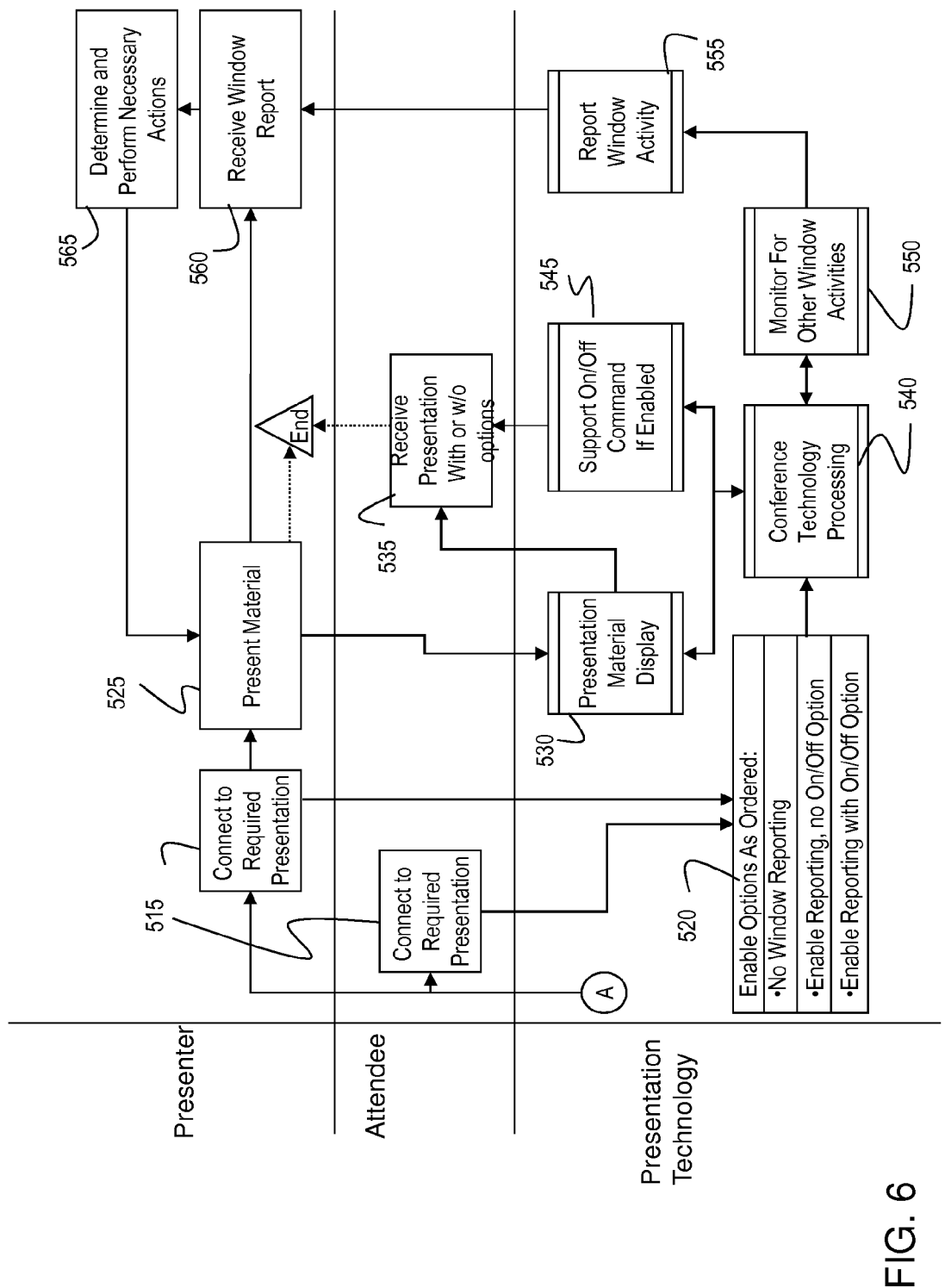

FIGS. 4-6 are swim lane diagrams showing processing steps of embodiments of the invention and respective participants. FIGS. 4-6 may equally represent a high-level block diagram of components of the invention implementing the steps thereof. The steps of FIGS. 4-6 may be implemented on computer program code (Program Code Logic) in combination with the appropriate hardware as shown representatively in FIG. 1. The computer program code may be stored on storage media such as a diskette, hard disk, CD-ROM, DVD-ROM or tape, as well as a memory storage device or collection of memory storage devices such as read-only memory (ROM) or random access memory (RAM), generally represented as reference numerals 22A or 22B of FIG. 1. Additionally, the computer program code can be transferred to a workstation over the Internet or some other type of network.

The invention can take the form of hardware and software elements. The hardware and software elements include a computer infrastructure configured to implement the functionality of the present invention. The computer infrastructure may take the form, for example, of the environment of FIG. 1. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 4 shows an active window reporting enablement feature in accordance with the invention. Prior to initiating the services of the remote monitoring and/or reporting tool, participants in the presentation should preferably have an agent already downloaded onto their computing device. If not, the processes of the invention can include an automatic download using, for example, a tool wizard known to those of skill in the art. Alternatively, the agent can be pushed to the device attempting to connect to the presenter's device.

At step 400, the presenter requests the remote monitoring and/or reporting service from a service provider. At step 405, the presenter opens the appropriate collaboration tool and establishes the required presentation technology to support the presentational materials. At step 410, the service provider provides options to the presenter for activating the remote monitoring and/or reporting tool. These options may include, for example:

do not enable remote monitoring;
enable monitoring; or
enable monitoring with permissions.

The presenter can then select one of the options in order to continue with the presentation. The permissions enable the attendees to enable or disable the remote monitoring and/or reporting tool.

When the presenter selects the option of continuing with the presentation without the monitoring and reporting feature, at step 415, the service provider will continue with initiating the presentation without the remote monitoring and reporting feature of the present invention. At step 420, the presenter will receive confirmation of the selected option from the service provider. The presenter can present the presentation materials without the monitoring and reporting functions of the present invention.

When the presenter selects the enable monitoring or enable monitoring with permissions, at step 425, the service provider will activate the remote monitoring and/or reporting tool. At step 430, the selected option may then be passed back to the collaboration tool (presenter) for confirmation. At step 435, the presenter can present the presentation materials with the option of either monitoring or monitoring with permissions. In embodiments, the service provider can wait in a stand by mode for the next request.

FIGS. 5 and 6 show an implementation of the active window reporting enablement feature in accordance with the invention. More specifically, at step 500, the presenter will determine whether to activate the remote monitoring and/or reporting tool of the present invention and which options would be required during the presentation of materials. At step 505, the presenter will activate the remote monitoring and/or reporting tool and select the appropriate options. The options may include, for example, enable monitoring;
permit the attendees to remove the monitoring; and/or
enable reporting features with the attendee permitted to enable/disable the function, etc.

If the presenter selects the no window reporting option, the remote monitoring and/or reporting tool enables the presentation without monitoring support. If the presenter selects the enable reporting with no on/off option, the reporting function will be enabled and the remote monitoring and/or reporting tool will not provide the ability for the attendee(s) to turn off the reporting function. If the presenter selects the enable reporting with on/off option, the reporting function will be enabled and the remote monitoring and/or reporting tool will permit the attendee(s) or presenter the ability to turn on or off the reporting feature.

At optional step 510, the service provider will activate the remote monitoring and/or reporting tool. As should be understood, the remote monitoring and/or reporting tool can be implemented through a service provider or can be built directly into the collaboration technology, e.g., e-meeting, or be resident on the computing device of the presenter and initiated upon execution of the collaboration technology, depending on the desired application. In the latter embodiment, the monitoring and/or reporting tool can be a stand-alone component which can then be used with any number of collaboration technologies. Thus, although FIG. 5 shows an implementation of using the service provider, it should be understood by those of skill in the art that FIG. 5 can equally represent the remote monitoring and/or reporting tool being activated directly from the computing device of the presenter.

Referring to FIG. 6, at step 515, the attendee(s) are connected to the presentation. At step 520, the presenter and attendee(s) are provided with options from the remote monitoring and/or reporting tool. Again, these options may include enabling the remote monitoring and/or reporting tool, with reporting options as discussed above. During or prior to this processing, the remote monitoring and/or reporting tool may also request further information from the participants including, for example, user ID and passcode.

Depending on the selected option, which varies depending on the selections by the attendee(s), the presentation material can be presented at step 525. If the presenter is using a service provider, the service provider will provide the monitoring at optional step 530. The presentation can then be displayed to the attendees at step 535, with the selected reporting and/or monitoring options. The attendees can select the option via a keyboard, mouse or other interactive response. Alternatively, if the remote monitoring and/or reporting tool is built directly into the collaboration tool (or the presenter's computing device), the presentation can be displayed directly to the attendees at step 535 with the selected reporting and/or monitoring options, thereby bypassing the service provider.

With the one or more options selected to be enabled, at step 540, the remote monitoring and/or reporting tool is enabled. If the presenter selected the reporting on/off option, at step 545, the command will be enabled (e.g., by either a service provider or directly from the collaboration tool) at step 545. At step 535, the presentation can be displayed to the attendees. The presentation will include an on/off command allowing any of the attendees (or presenter) to enable or disable the reporting option.

At step 550, the remote monitoring and/or reporting tool will begin monitoring for active windows displayed on the computing devices of the attendees. At step 555, the remote monitoring and/or reporting tool will report the activity for each attendee that opted for the reporting option. Depending on the embodiment, the reporting may be performed by the service provider or generated directly from the remote monitoring and/or reporting tool.

At step 560, the presenter will receive the report and, at step 565, the presenter will determine an appropriate action to take. This may include, for example, terminating the presentation, requesting the appropriate attendees to display the presentation materials as the active window, amongst other possibilities.

Exemplary Displays

Figure 7:
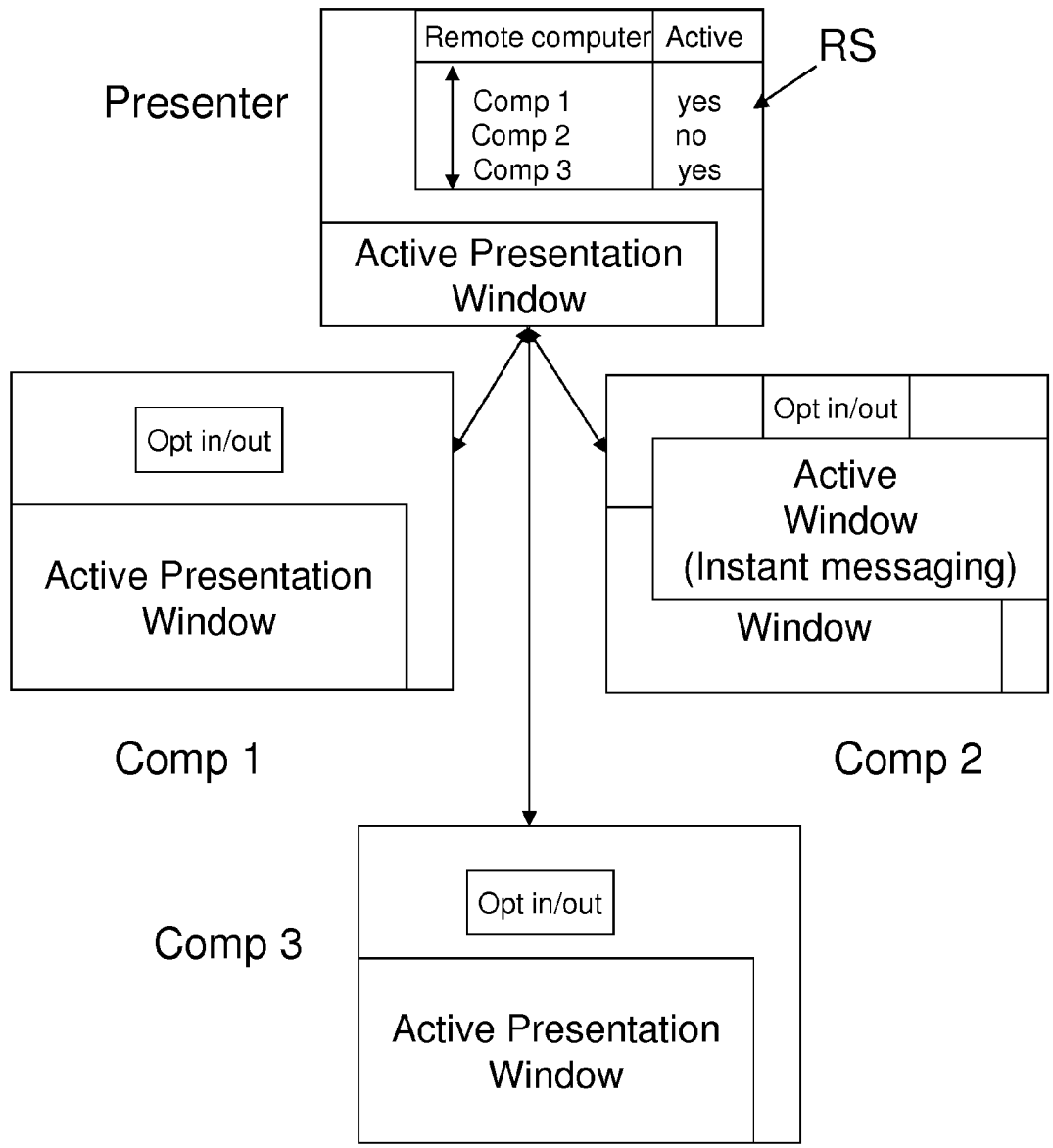
FIG. 7 shows several graphical user interfaces showing an exemplary implementation of the invention.

FIG. 7 shows exemplary displays of participants of the presentation. In particular, the displays include a presenter and three attendees (comp 1, comp 2, comp 3). In this example, all of the attendees opted for participation in the service of the present invention. As shown representatively, the presenter's display includes an active window and a reporting screen (RS). The reporting screen (RS) includes a column identifying the remote computers connected to the presentation and a column indicating the active window status of the remote computers. The reporting screen (RS) can include a scroll in order to view other remote computers and their status. The reporting screen (RS) can also include messages such as, for example, which windows are active on the remote computers, any problems or issues that are occurring at the remote computers, etc.

In attendees' computing devices (comp 1, comp 2, comp 3), an opt in/out option may appear in order for the attendees to enable/disable the remote monitoring and/or reporting tool. In the example of FIG. 7, the attendee (comp 2) either disengaged the tool or is using a window that is not associated with the presentation, as shown by the reporting screen (RS).

While the invention has been described in terms of embodiments, those skilled in the art will recognize that the invention can be practiced with modifications and in the spirit and scope of the appended claims.

What is claimed is:

1. A system, comprising:
 a computer processor;
 a computer readable hardware storage device;
 program code of a remote monitoring and reporting component stored on the computer readable hardware storage device for execution by the computer processor, the program code comprising:
  program code that determines whether active windows of one or more remote devices are participating in a presentation of a presenter;
  program code that provides each of the one or more remote devices with a selection to disable the determining of whether the active windows of the one or more remote devices are participating in the presentation of the presenter, while keeping a reporting active, and to receive the presentation with the determining disabled; and
  program code that provides reports to the presenter regarding which of the one or more remote devices made the selection to disable the determining, wherein the remote monitoring and reporting component further comprises:
  program code to provide the presenter with a selection to disable the monitoring and reporting component and a selection to send the presentation with the monitoring and reporting component disabled;
  program code to provide a report to the presenter identifying the active windows of the one or more remote devices and indicating whether the active windows are participating in the presentation of the presenter;
  program code to provide a report to the presenter indicating that a system failure or a maintenance issues has occurred on the one or more remote devices; and
  program code to enable the presenter to request that users of the one or more remote devices display the presentation of the presenter as an active window.

2. The system of claim 1, wherein the remote monitoring and reporting component further comprises program code that provides the presenter with a selection to disable the monitoring and reporting component and a selection to send the presentation with the monitoring and reporting component disabled.

3. The system of claim 1, wherein the remote monitoring and reporting component further comprises program code that requests information from the one or more remote devices as to whether the active windows are participating in the presentation.

4. The system of claim 1, wherein the remote monitoring and reporting component further comprises program code that receives a status of a first active window displayed by a first remote device of the one or more remote devices from an agent at the first remote device.

5. The system of claim 4, wherein the status identifies the first remote device and indicates whether a first presentation window is active on the first remote device.

6. The system of claim 1, wherein the remote monitoring and reporting component further comprises program code that generates a reporting screen indicating a status of the active windows of the one or more remote devices.

7. The system of claim 1, wherein the remote monitoring and reporting component is activated with a collaboration tool.

8. The system of claim 1, wherein the remote monitoring and reporting component is integrated into a collaboration tool.

9. The system of claim 1, wherein the remote monitoring and reporting component is used over the Internet.

10. The system of claim 1, wherein the remote monitoring and reporting component further comprises program code that provides selections for the presenter and the one or more remote devices.

11. The system of claim 1, wherein the remote monitoring and reporting component further comprises program code that receives a confirmation from each of the one or more remote devices of an opt in or opt out selection selected by each of the one or more remote devices.

12. A method for deploying a monitoring and reporting component, comprising:
 determining, by a computing device, whether active windows on one or more remote devices are participating in a presentation of a presenter;
 providing, by the computing device, permissions to each of the one or more remote devices to provide each of the one or more remote devices with a selection to disable the determining of whether the active windows are participating in the presentation of the presenter, while keeping a reporting active, and to receive the presentation with the determining disabled; and reporting to the presenter which of the one or more remote devices made the selection to disable the determining, receiving, by the computer device, a selection by the presenter to provide the permissions to each of the one or more remote devices;

providing, by the computer device, a report to the presenter identifying the active windows of the one or more remote devices and indicating whether the active windows are participating in the presentation of the presenter; and providing, by the computer device, a request to the one or more remote devices to display the presentation of the presenter as an active window.

13. The method of claim 12, wherein a service provider requests an active window status, receives the active window status and generates the report and sends the report to the presenter.

14. The method of claim 13, further comprising implementing a collaboration tool with the request of the active window status.

15. The method of claim 12, wherein the computer infrastructure provides the report of a status of the active windows to the presenter.

16. The method of claim 12, wherein the computer infrastructure receives information from an agent residing on the one or more remote devices as to whether the active windows are participating in the presentation.

17. A computer program product for monitoring active window status on a remote device and generating a report of the active window status, the computer program product comprising:

a computer readable storage memory including:

program instructions to determine whether active windows on one or more remote devices are participating in a presentation of a presenter;

program instructions to provide permissions to each of the one or more remote devices to provide each of the one or more remote devices with a selection to disable the determining of whether the active windows are participating in the presentation of the presenter, while keeping a reporting active, and to receive the presentation with the determining disabled; and program instructions to provide a report to the presenter regarding which of the one or more remote devices made the selection to disable the determining, wherein the program instructions are stored in a computer system computer readable hardware storage device for execution by a central processing unit of a computing device, program instructions to provide the presenter with a selection to disable the monitoring and reporting component and a selection to send the presentation with the monitoring and reporting component disabled;

program instructions to provide a report to the presenter identifying the active windows of the one or more remote devices and indicating whether the active windows are participating in the presentation of the presenter;

program instructions to provide a report to the presenter indicating that a system failure or a maintenance issues has occurred on the one or more remote devices; and program instructions to enable the presenter to request that users of the one or more remote devices display the presentation of the presenter as an active window.

* * * * *